(12) United States Patent
Watkins et al.

(10) Patent No.: US 8,834,059 B2
(45) Date of Patent: Sep. 16, 2014

(54) RETRIEVABLE CONNECTOR FOR COMPOSITE MATERIAL SUCKER ROD

(75) Inventors: Damon L. Watkins, Levelland, TX (US); Scott William Long, Midland, TX (US); Johnny B. Fayo, Odessa, TX (US); Norman W. Hein, Jr., Tulsa, OK (US)

(73) Assignee: Delaware Capital Formation, Inc., Wilmington, DE (US)

( * ) Notice: Subject to any disclaimer, the term of this patent is extended or adjusted under 35 U.S.C. 154(b) by 57 days.

(21) Appl. No.: 13/618,951

(22) Filed: Sep. 14, 2012

(65) Prior Publication Data

US 2014/0079470 A1   Mar. 20, 2014

(51) Int. Cl.
*F16B 11/00*   (2006.01)

(52) U.S. Cl.
USPC ......................................................... 403/268

(58) Field of Classification Search
CPC ... E21B 17/04; E21B 17/0426; E21B 17/023; F16B 11/008; F16B 13/141; F16B 7/02; F16B 2013/007; F16B 2013/141; F16C 7/023
USPC .................................................. 403/268, 269
See application file for complete search history.

(56) References Cited

U.S. PATENT DOCUMENTS

| | | | |
|---|---|---|---|
| 2,263,910 A | 11/1941 | Williams | |
| 3,419,075 A | 12/1968 | Brown | |
| 3,454,294 A | 7/1969 | Plunk | |
| 4,401,396 A * | 8/1983 | McKay | 403/13 |
| 4,430,018 A * | 2/1984 | Fischer | 403/268 |
| 4,433,933 A * | 2/1984 | Parsons et al. | 403/268 |
| 4,494,890 A | 1/1985 | Lusk | |
| 4,589,796 A * | 5/1986 | Newling | 403/266 |
| 4,653,953 A | 3/1987 | Anderson et al. | |
| 4,662,774 A * | 5/1987 | Morrow, Jr. | 403/266 |
| 4,822,201 A | 4/1989 | Iwasaki et al. | |
| 4,919,560 A | 4/1990 | Rutledge | |
| 5,149,163 A | 9/1992 | Pruitt | |
| 5,233,946 A | 8/1993 | Yamami | |
| 5,253,946 A * | 10/1993 | Watkins | 403/268 |
| 6,193,431 B1 | 2/2001 | Rutledge | |
| 6,425,615 B1 | 7/2002 | Mullane, Jr. | |
| 6,935,427 B1 | 8/2005 | Billingsley | |
| 7,070,401 B2 | 7/2006 | Clendenin et al. | |
| 8,062,463 B2 * | 11/2011 | Rutledge et al. | 156/289 |
| 8,113,277 B2 * | 2/2012 | Rutledge et al. | 166/242.6 |
| 2009/0294118 A1 | 12/2009 | Clemens | |
| 2010/0239433 A1 * | 9/2010 | Rutledge, Sr. | 417/1 |
| 2010/0259040 A1 * | 10/2010 | Kjolseth et al. | 285/296.1 |
| 2012/0141194 A1 * | 6/2012 | Rutledge et al. | 403/268 |
| 2013/0039691 A1 * | 2/2013 | Rutledge et al. | 403/265 |
| 2014/0102715 A1 * | 4/2014 | Rutledge et al. | 166/378 |

* cited by examiner

*Primary Examiner* — Joshua Kennedy
(74) *Attorney, Agent, or Firm* — Head, Johnson & Kachigian, P.C.

(57) ABSTRACT

A connector to secure to the end of a cylindrical rod to transfer and distribute stress uniformly from the connector to the rod with a recess to cooperate with a retrieval tool to allow recovery of fractured rod strings or broken connectors. The connector includes an elongated body having a receptacle with a cylindrical wall, a top end and a recess where the recess is adjacent to the top end. A plurality of axially aligned tapered annuluses, coaxial with the receptacle, extends from the cylindrical wall into the body. Each annulus has a cross-section that is radially arcuate with one end tangentially approaching the cylindrical wall and the other end arcuately approaching the cylindrical wall.

5 Claims, 9 Drawing Sheets

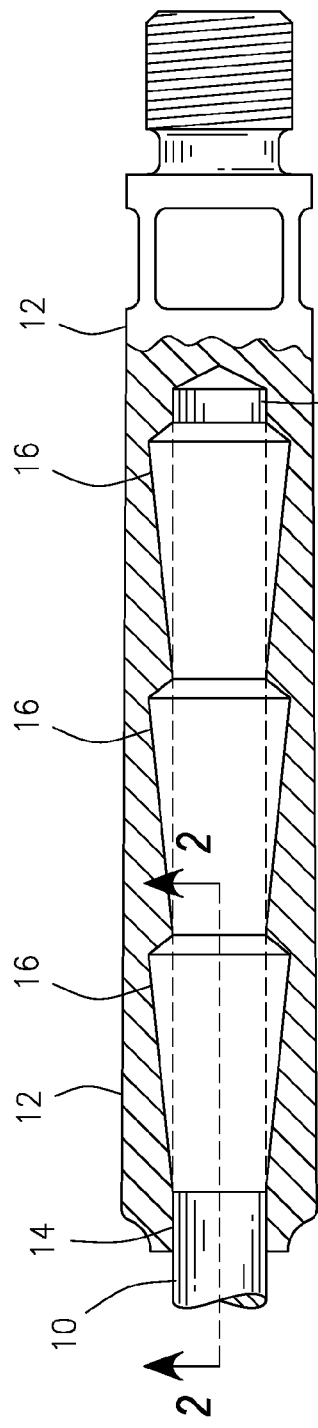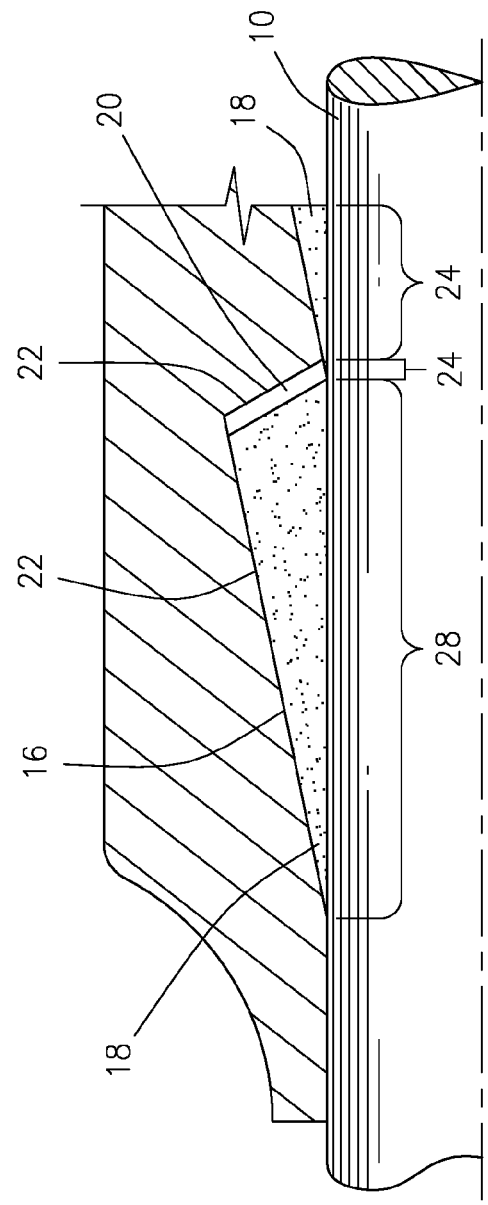
FIG. 1
PRIOR ART
FIG. 2
PRIOR ART

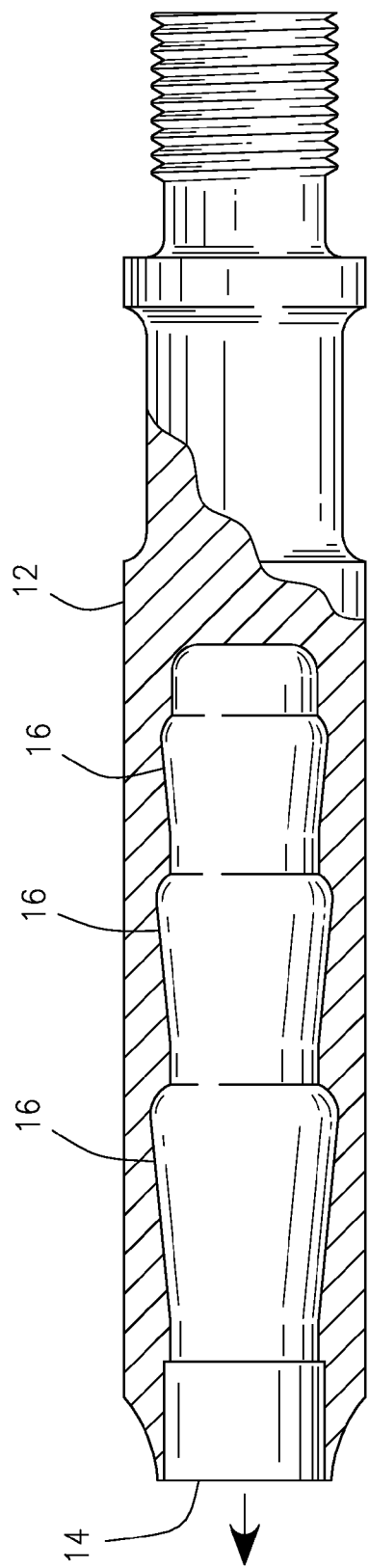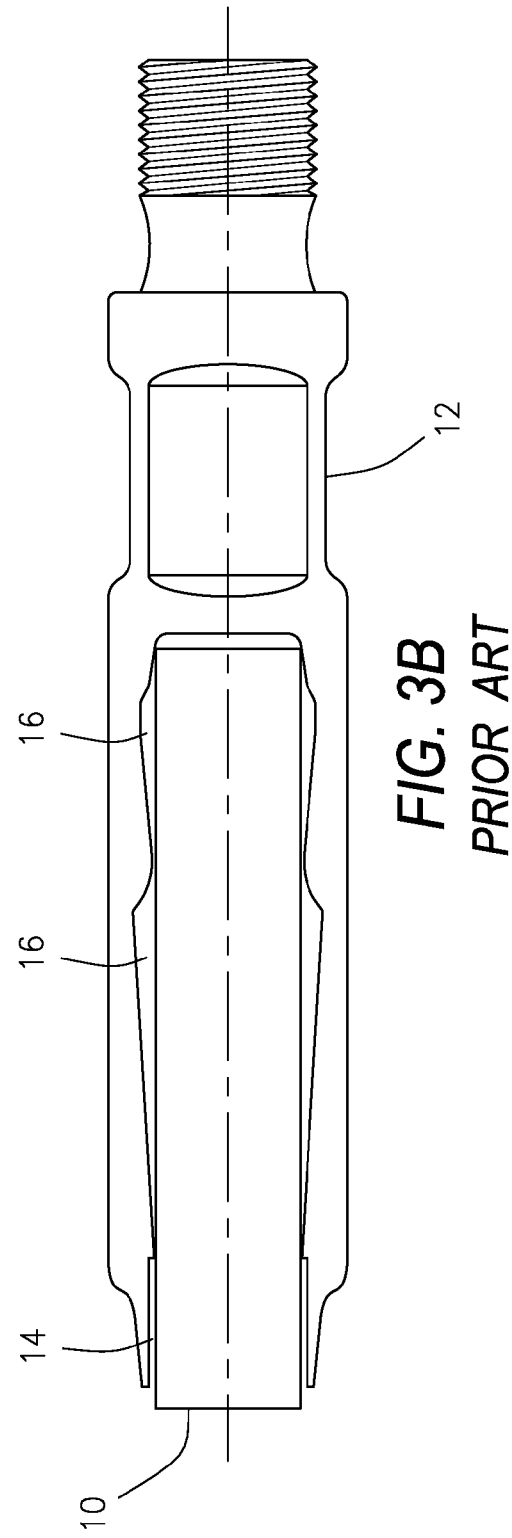
FIG. 3A
PRIOR ART
FIG. 3B
PRIOR ART

RETRIEVABLE CONNECTOR FOR COMPOSITE MATERIAL SUCKER ROD

BACKGROUND OF THE INVENTION

1. Field of the Invention

The present invention relates to an improved connector device to connect the end of a composite material rod. In particular, the present invention relates to improvements to a connector to connect the end of the composite material rod so that rods are connected therein in an end-to-end relationship.

2. Prior Art

The use of cylindrical sucker rods is well known in underground wells to actuate a pump located in an underground wellbore of a well. A series of sucker rods connected together in an end-to-end relationship form a string which extends down into the wellbore. The string is connected to a subsurface pump at one end and to a reciprocating mechanism at the well head on the surface at the other end in order to actuate the pump to lift well fluids to the surface.

While at one time steel sucker rods were common, over the last three decades the oil and gas industry has been using fiberglass for sucker rods and, more recently, using composite matrix material, such as fiberglass composite, graphite composite, metal matrix composite, ceramic matrix composite or other composite matrix materials, for sucker rods. Composite matrix material rods are advantageous over metal because they are lighter than metal, withstand corrosive effects better than metal and have greater elasticity than metal, and are advantageous over fiberglass because they are stronger than fiberglass while having the same advantages of fiberglass.

The individual composite material rods are connected together by metal connectors (also sometimes called end fittings) that are generally elongated members having an axial receptacle. The connector will typically have an opposite threaded end so that a pair of connectors may be secured together. The composite material rod may be connected to the connector through use of an adhesive which will bond to the rod. Once the adhesive adheres to the rod and becomes a solid, it is referred to as a wedge and a plurality of wedges in the connector is referred to as a wedge system.

Various designs have been suggested to produce a good bond and attachment between the rod and the adhesive to create a wedge system that is captured within the annuluses of the connector to create a sucker rod. Two operational limitations of composite sucker rods, however, still leave much room for improvement: (1) the ability of the sucker rod to endure the hostile operating and loading conditions in which they operate and (2) the difficulty of retrieving a broken composite matrix material sucker rod from the wellbore.

Examples of prior connector designs are disclosed in Anderson et al. (U.S. Pat. No. 4,653,953), Iwasaki et al. (U.S. Pat. No. 4,822,201) and Rutledge, Jr. et al (U.S. Pat. No. 4,919,560). These designs teach a connector that has a series of wedge or partial cone-shaped annulus recesses extending from the receptacle into the body of the connector that are used to form the wedge system within the connector. Some of these prior designs recognized that radial stresses are not constant across the wedge system and therefore varied the angle of inclination from one wedge to the next.

In order to make the attachment of the rod to the metal connector, an initially flowable adhesive is placed in the receptacle of the connector. A rod end is then inserted into the receptacle. The insertion of the rod forces the flowable adhesive to fill the void spaces in the wedge-shaped or partial cone-shaped recesses. The adhesive will cure becoming a solid and will adhere to the rod. The solid adhesive is bonded to the rod and not to the inside of the metal connector. The solid adhesive bonded to the rod forms a series of wedges, having the shape of the recesses within the connector to create the wedge system that captures the rod within the receptacle of the connector.

When the assembled rod is pulled by applying tension to its threaded ends, the solid adhesive wedges, which are bonded to the rod only, are forced against the annuluses area of the recesses inside the metal connector. Slippage, which occurs between the rod body and the connector, causes the larger end of the adhesive wedge to separate from the annulus surfaces of the metal connector leaving a slight gap.

A radial compressive force is imparted to the rod itself as the metal connector and the adhesive wedge press against each other to resist any further slippage. This force of compression is applied across the entire interval where the adhesive wedge and the metal surface are in contact. No compression force is applied in the segment adjacent to the gap.

The abrupt change at the end of the gap from no compression force to full, heavy compression force results in a concentration of shear stress at that point, leading to the possibility of failure in the sucker rod.

Accordingly, newer designs were developed to address these failures including Watkins (U.S. Pat. No. 5,233,946) and Rutledge (U.S. Pat. No. 6,193,431). Watkins teaches a connector with a plurality of annuluses where each annulus has an arcuate transition surface at each end of the annulus such that one end of the annulus is tapered to a tangent with the wall of the cylindrical receptacle where the concentration of shear stress is the highest and the other end of the annulus asymptotically approaches the wall of the cylindrical receptacle. Each of the tapered annuluses differs in length and the plurality of annuluses is arranged so that the annuluses decrease in length from the opening of the receptacle. Rutledge teaches a connector with asymptotic transition surfaces between multiple wedges and at the closed end of the connector. These designs are similar to the earlier designs, except for the transition curves at the ends of each annulus that forms the wedge. Both of these designs attempt to reduce the shear stress at the rod surface by eliminating the abrupt angle change at the ends of the wedges that are typical of earlier connector designs. While these designs represented an improvement over prior designs, considerable room for improvement exists.

Also, neither of these designs addresses the further need to retrieve a broken composite material sucker rod from the wellbore with a retrieval tool or, as more commonly referred to in the industry, a "fishing" tool.

Present connector designs have no recess to allow the composite matrix material rod connectors to be grasped by a retrieval tool. In the event that a rod breaks, the well tubing (pipe) inside of which the rods are installed must be pulled out of the well to retrieve the broken rod, or a special retrieval tool must be used to grasp the connector to retrieve the broken rod. These special tools are very expensive and not widely available. Some types of these tools are fragile and often suffer breakage after only one use. Two of these special retrieval tools, for example, are described in Pruitt (U.S. Pat. No. 5,149,163) and Mullane, Jr. (U.S. Pat. No. 6,425,615). Pruitt teaches retrieving composite sucker rods by grasping the wrench flats of the connector. This retrieval tool both grasps and releases the connector with a ⅛ turn of the tool, which is not ideal for retrieval of a broken rod. Mullane, Jr. teaches retrieving the connector by lowering a retrieval tool over the outside of the connector and biting into the outside surface of connector.

Retrieval tool recesses are used in other applications, where various downhole devices are set and/or retrieved from inside tubing and/or the wellbore. The retrieval tool would be lowered into the well from a hoisting device located at the surface. The top of the downhole device that is to be retrieved must be configured such that the retrieval tool will be securely latched onto the downhole device once the two devices are engaged. The upper end of downhole devices that are intended for recovery by this method are typically equipped with a reduced diameter extension or neck with a retrieval tool recess formed near the upper end of the extension. The fingers of the retrieval tool latch into the recess on the reduced diameter extension to establish a secure connection between the retrieval tool and the downhole device. The downhole device can then be pulled from the wellbore by the surface hoisting device. These designs are taught by Williams (U.S. Pat. No. 2,263,910), Brown (U.S. Pat. No. 3,419,075), Plunk (U.S. Pat. No. 3,454,294), Billingsly (U.S. Pat. No. 6,935,427), McCannon (U.S. Pat. No. 7,040,401) and Clemens (U.S. Patent Application No. 2009/0294118). The reduced diameter retrieval extensions described in the above designs have two features that make them unsuitable for retrieving broken fiberglass sucker rods: (1) the geometry of fiberglass sucker rod connectors cannot accommodate a reduced diameter retrieval extension neck as the broken composite matrix material rod occupies the space at the top of the connector that is used for the retrieval extension in other types of applications; as illustrated in FIG. 12 and (2) the open end of the small diameter retrieval tools used in present designs for other applications are too small to capture the splintered body of the broken composite matrix material rod because when a composite matrix material rod fractures, it often creates splintered segments that expand beyond the original diameter of the rod and the reduced diameter retrieval tool cannot capture the expanded rod section.

One fiberglass sucker rod connector by Parsons, Jr. et al. (U.S. Pat. No. 4,433,933) teaches an exterior annular shoulder formed near the open end of the connector by gradually tapering the outer surface inwardly at an angle of 5 degrees for the purpose of allowing the jaws of a retrieval tool to cooperate with the shoulder to retrieve a broken fiber reinforced sucker rod from the wellbore. This design is only effective if the failure of the sucker rod is in the fiberglass rod body above this shoulder. When this fracture occurs, then the shoulder on the exterior of the connector can be engaged by a retrieval tool and the remaining rod string can be removed from the wellbore. If the fiberglass rod connector and coupling connection fails in the wrench flat, threaded pin, or coupling, there is no shoulder that can be grasped by the retrieval tool as shown in FIG. 11. The shoulder that provides a gripping edge is now upside down and will not cooperate with the fingers of the retrieval tool to grasp the connector.

Accordingly, there exists a need to design a rod connector with a plurality of annuluses that will cooperate with a wedge system to spread out the force of compression uniformly along each wedge and eliminate the concentration of radial stress in each wedge.

Also, there is a need to design a rod connector that incorporates a full diameter recess on the exterior of the rod end of the connector to accommodate recovery of broken rods with a retrieval tool.

It is, therefore, a principal object and purpose of the present invention to provide a connector for a composite material rod that will spread out or distribute the force of compression uniformly along each wedge of the wedge system within the receptacle of the connector to eliminate the concentration of radial stress in the wedge.

It is a further object and purpose of the present invention to provide a connector for a composite material rod having wedges with segments with optimum ranges of the ratio of radius length to total wedge length for the connector.

It is also a principal object and purpose of the present invention to provide a connector with a full diameter recess on the exterior of the rod end of the connector to accommodate recovery of broken rods with a retrieval tool.

SUMMARY OF THE INVENTION

The present invention provides an improved connector to be attached to each end of a composite material rod to act as end fittings of a sucker rod where the connector forms a wedge system within the receptacle of the connector that will spread out or distribute the force of compression uniformly along each wedge to eliminate the concentration of radial stress. The connector also has a recess that cooperates with a full diameter retrieval tool to allow a broken sucker rod to be retrieved from the wellbore. The connector may be connected to another connector so that rods may be connected in an end-to-end relationship.

The connector includes an elongated body having a receptacle. A series of tapered annuluses are axially aligned with each other and are coaxial with the receptacle. The shape of each annulus is radially arcuate rather than straight.

Each annulus has a cross-section defined by a line having a predetermined shape that is radially arcuate. The line comprises a leading transition segment, a primary load bearing segment, a trailing transition segment and a back segment. The leading transition segment has a substantially convex shape that is radially arcuate as viewed from within the receptacle where one end arcuately approaches the receptacle wall and where other end terminates at one end of the primary load bearing segment. The primary load bearing segment has a substantially convex shape that is radially arcuate as viewed from within the receptacle where other end terminates at one end of the trailing transition segment. The trailing transition segment has a substantially concave shape that is radially arcuate as viewed from within the receptacle where the other end terminates at one end of the back segment. The back segment has a substantially concave shape that is radially arcuate as viewed from within the receptacle where other end approaches the receptacle wall.

The design of the annulus in the connector results in a uniform amount of compressive stress being applied over the entire length of the wedge, which provides the optimum distribution of radial stresses that are impressed on the exterior surface of the composite material rod body.

The connector also includes a recess in the elongated body at a predetermined location on the exterior surface of the elongated body. The recess has a substantially channel shape of predetermined dimensions whereby the recess cooperates with a retrieval tool to allow retrieval of the sucker rods when a connector breaks or a rod breaks.

BRIEF DESCRIPTION OF THE DRAWINGS

FIG. 1 illustrates a prior art connector or end fitting for a rod which is partially cut away;

FIG. 2 illustrates an enlarged view of the prior art connector taken along the section line 2-2 of FIG. 1;

FIG. 3A illustrates a second prior art connector or end fitting for a rod which is partially cut away;

FIG. 3B illustrates a third prior art connector or end fitting for a rod which is partially cut away;

DETAILED DESCRIPTION OF THE PREFERRED EMBODIMENT

Figure 4:
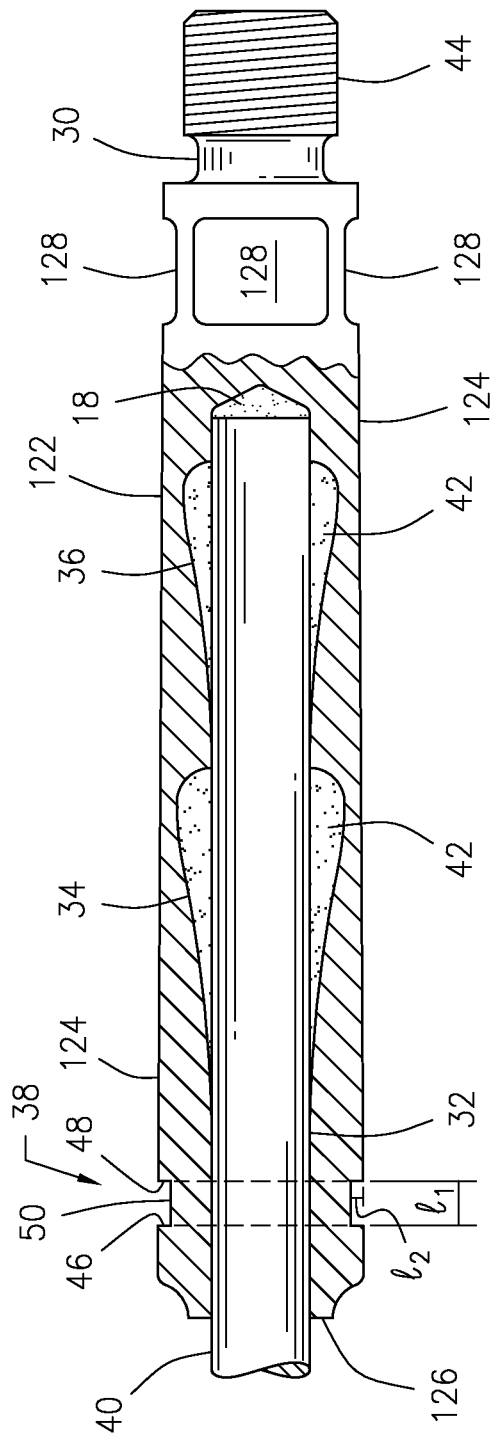
FIG. 4 illustrates an improved and retrievable connector constructed in accordance with the present invention with the composite material rod inserted and adhesive affixed to the rod which is partially cut away.

Referring to the drawings in detail, FIG. 1 illustrates a partial cross-section of a prior art connector 12 receiving a cylindrical rod 10 composed of fiberglass material. The fiberglass rods 10 are connected in an end-to-end relationship to form a string through use of connectors such as connector 12. The connector 12 is typically comprised of an elongated body having a cylindrical receptacle 14. The receptacle 14 includes a plurality of wedge-shaped or partial cone-shaped annuluses 16 which are coaxial with the axis of the cylindrical receptacle 14. The annuluses 16 extend into the connector 12 and are wedge-shaped or partial cone-shaped in cross-section.

In order to secure the cylindrical rod 10 to the connector 12, a quantity of adhesive, which is initially in a flowable state, is placed in the receptacle 14. The rod 10 is then inserted into the receptacle 14. The adhesive will fill each of the wedge-shaped or partial cone-shaped annulus 16. The adhesive will cure to a solid and adhere to the rod to form a plurality of wedges 18 to create a wedge system. Each solid adhesive wedge 18 will take the form of the annulus 16, i.e. wedge-shaped or partial cone-shaped as shown in FIG. 1, extending from the surface of the rod. FIG. 2 illustrates an enlarged view taken along section line 2-2 of FIG. 1 of a portion of the connector 12 where the cured adhesive wedge 18 contacts the body of the connector 12.

As shown in FIG. 1 and FIG. 2, the profile or cross-section of the wedge-shaped or partial cone-shaped annulus 16 is a straight line which is shown in the X-Y plane. Also, as shown in FIG. 1 and FIG. 2, when the adhesive cures or hardens to a solid, it is securely bonded to the cylindrical rod 10 to create a wedge 18 with a straight line profile which is shown in the X-Y plane. While the wedge 18 fills the entire annulus 16, it is otherwise not bonded to the body of the connector 12.

Figure 11:
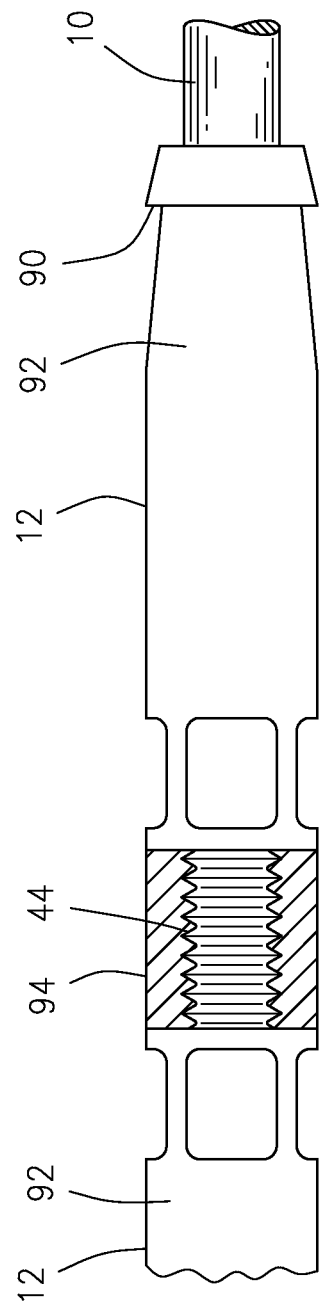
FIG. 11 illustrates two prior art connectors connected end-to-end where the upper connector is broken such that the exterior annular shoulder on the lower connector would not cooperate with a retrieval tool.
Figure 12:
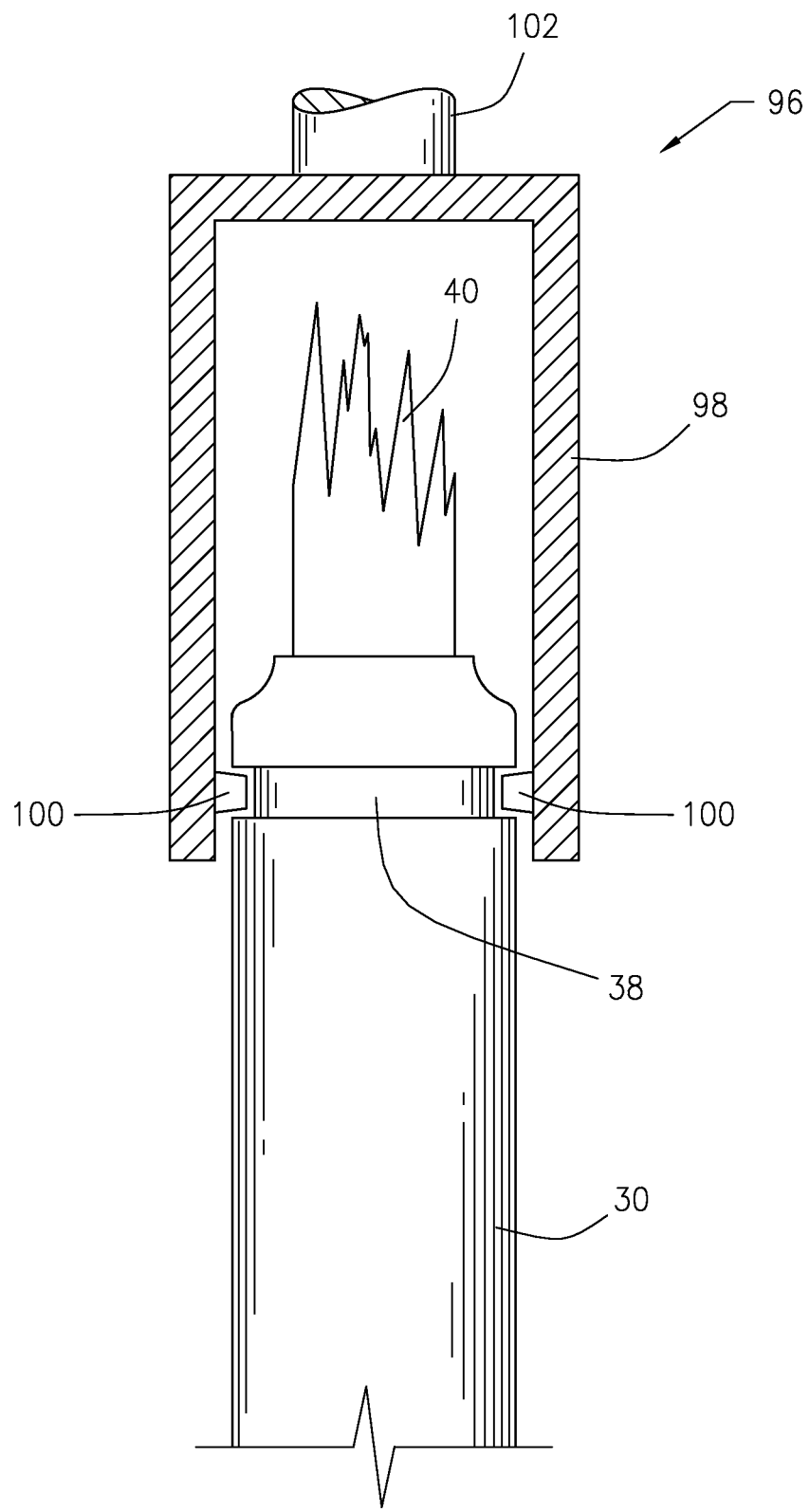
FIG. 12 illustrates a full diameter retrieval tool latched into the recess of the connector constructed in accordance with the present invention to allow recovery of the broken cylindrical composite matrix material rod portion of a sucker rod from a wellbore.

When the assembled rod 10 and adhesive have cured, one connector 12 will be threadably fastened to an adjoining connector 12 by a coupling 94, as shown in FIG. 11, so that the rods will be in an end-to-end longitudinal relationship.

When the assembled string is pulled in tension by the threaded ends, the wedges 18 are pressed against the inside surface of the annuluses 16. This action prevents and resists pulling the cylindrical rod 10 away from the connector 12. In practice, a small amount of slippage occurs between each wedge 18 and the connector 12. This causes the widest portion of each wedge 18 to separate from the mating surface to the connector receptacle 14 thereby leaving a gap 20 which can easily be seen in the enlarged view in FIG. 2.

Figure 10:
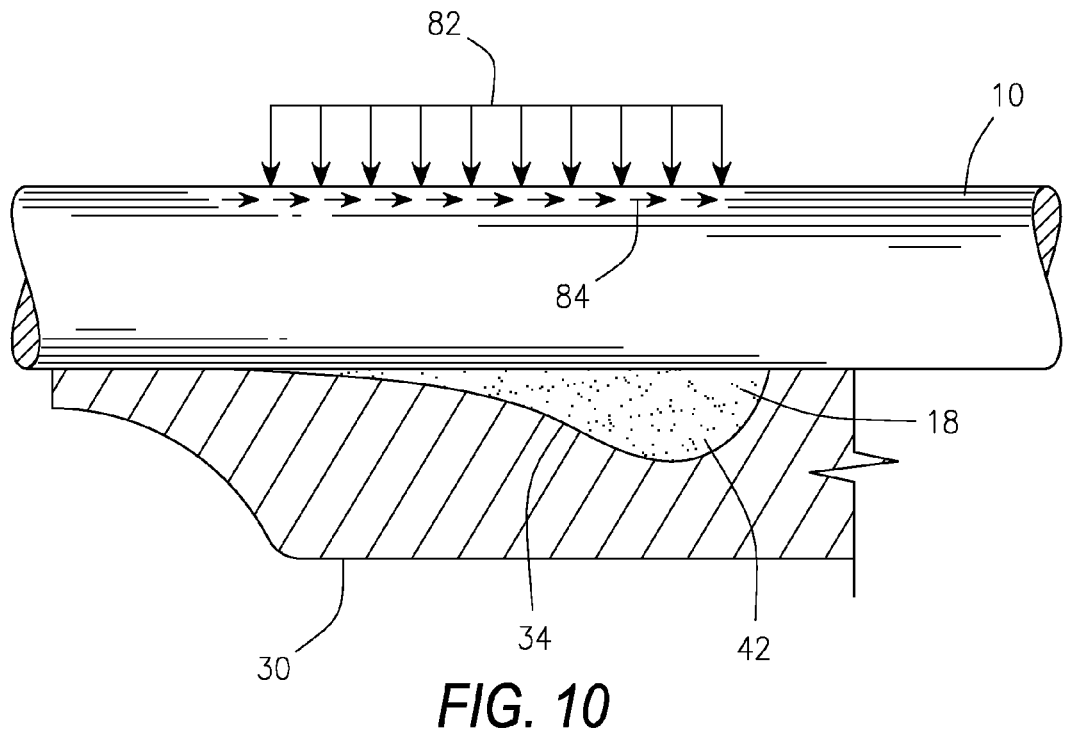
FIG. 10 illustrates the stresses that act along the interface of the adhesive wedge and the composite material rod when the primary load bearing wedge is optimized under the present invention.

A compressive stress is imparted to the cylindrical rod 10 as the adhesive solid wedge 18 and the linear surface 22 of the annulus 16 of the connector 12 press against each other to resist slippage as shown by the arrows in FIG. 10. This compression stress is applied across the interval for which the adhesive wedge 18 and the receptacle 14 make contact.

The abrupt change along the adhesive wedge 18 and, in turn, the rod 10 from no compressive force to heavy compressive force results in a concentration of shear stress at that point. It is at this point, the small end of the wedge 18, where most failures would initiate in the cylindrical rod 10 with this style of connector 12 designs.

FIGS. 3A and 3B illustrate prior art representing the next generation of connectors 12 that teach receiving a cylindrical rod 10 which may be composed of a fiber reinforced synthetic resin such as fiberglass or other lightweight material. The connectors 12 shown in FIGS. 3A and 3B are similar to the connector 12 shown in FIG. 1, except for the transition curves at the end of each wedge 18.

In FIG. 3A, the connector 12 has a plurality of annuluses 16 where each annulus 16 has an arcuate transition surface at each end of the annulus 16 such that one end of the annulus 16 is tapered to a tangent with the wall of the cylindrical receptacle 14 where the concentration of shear stress is the highest and the other end of the annulus 16 asymptotically approaches the wall of the cylindrical receptacle 14. Each of the tapered annuluses 16 differ in length and the plurality of annuluses 16 are arranged so that the annuluses 16 decrease in length from the opening of the receptacle 14.

In FIG. 3B, the annulus 16 has an end with an asymptotic transition between at least two wedges 18 and at the closed end of the connector 12.

FIGS. 1, 2, 3A, 3B and 11 and the foregoing discussion illustrate the prior art and do not constitute a part of the present invention.

Figure 7:
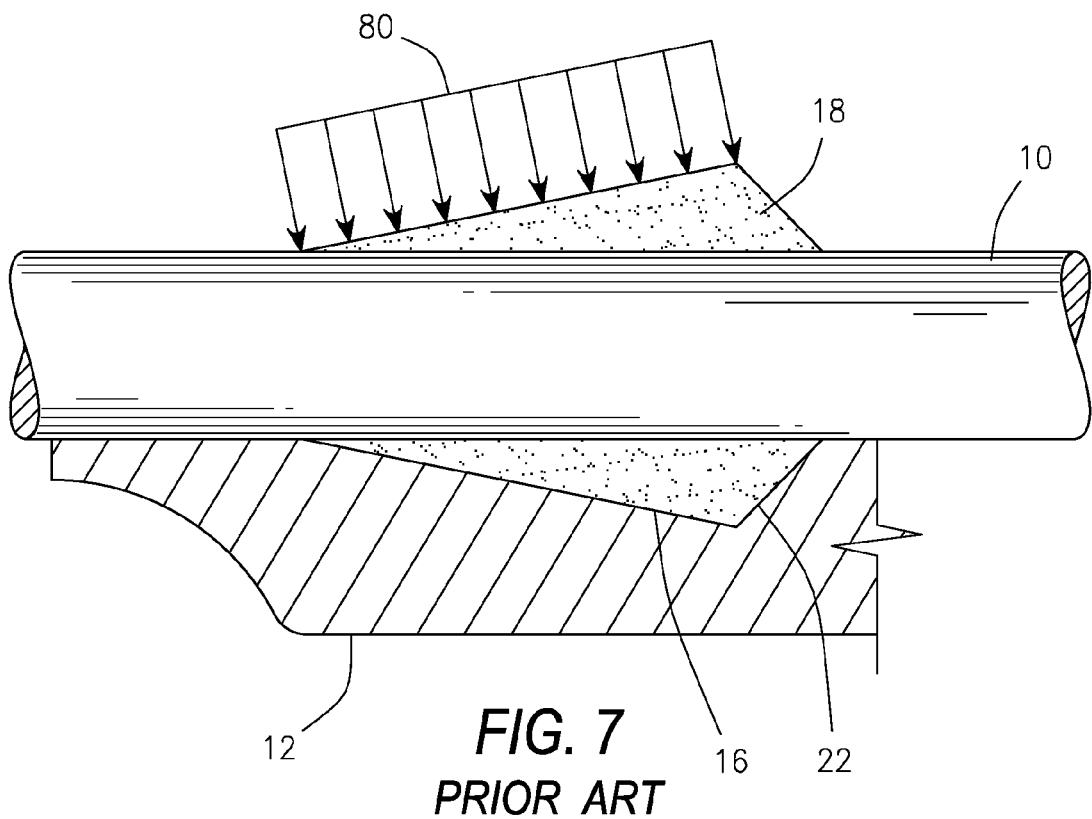
FIG. 7 illustrates the orientation of stresses that act along the interface of the metal connector and the adhesive wedge.

FIG. 7 shows resulting stresses illustrated by arrows that occur along the interface between the metal end connector and the wedge when the rod is loaded in tension. This loading diagram illustrates that stress is compressive toward the wedge and perpendicular to the interface between the metal fitting and the epoxy wedge.

Figure 8:
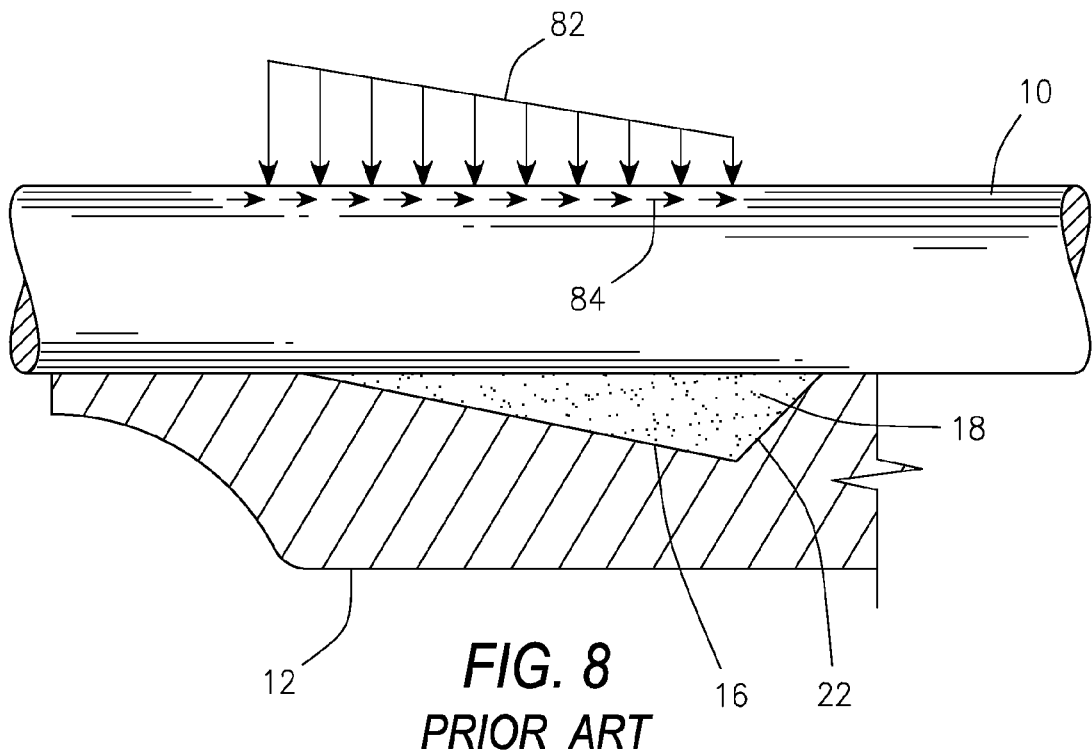
FIG. 8 illustrates the orientation of stresses that act along the interface of the adhesive wedge and the cylindrical composite material rod when a primary load bearing wedge profile is a straight or nearly straight line.

FIG. 8 illustrates a diagrammatic view of the radial compressive stresses illustrated by arrows perpendicular to the rod axis when the primary load bearing wedge surface profile is a straight line or nearly a straight line, such as in the prior art connectors. As can be seen from the stress arrows, the stress forces extend from a smaller amount at one end to a larger amount at the other end.

Figure 9:
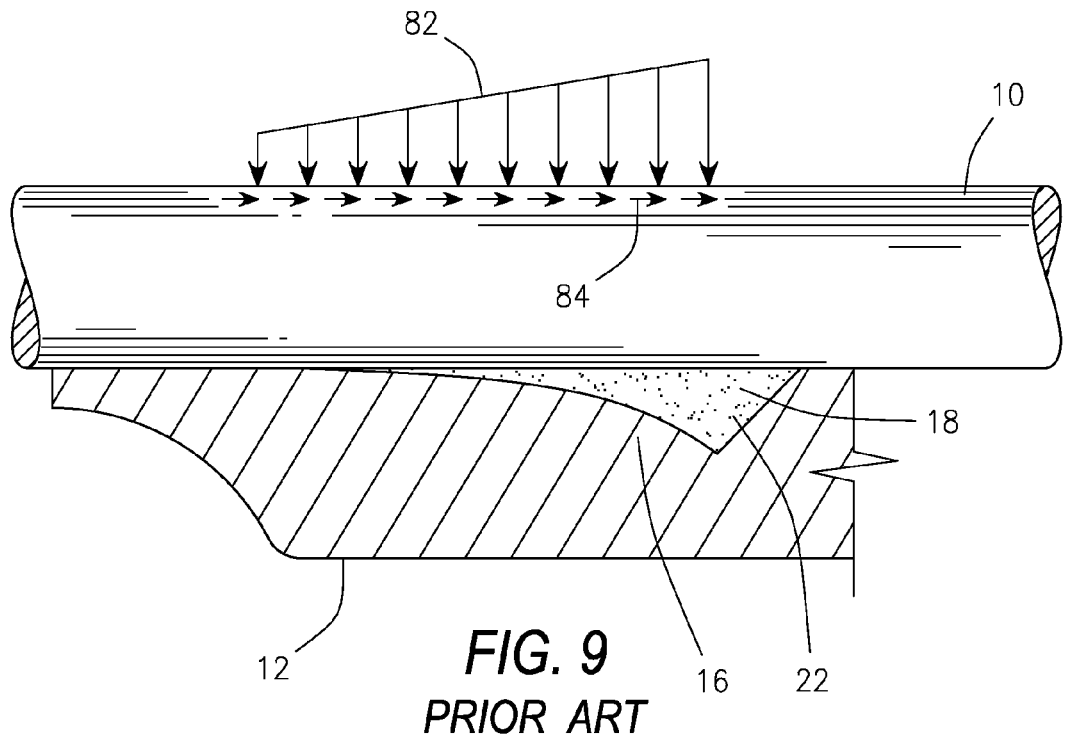
FIG. 9 illustrates the orientation of stresses that act along the interface of the adhesive wedge and the cylindrical composite material rod when the primary load bearing wedge profile is a short radius arc.

FIG. 9 illustrates a diagrammatic view of the radial stresses illustrated by arrows perpendicular to the rod axis when the primary load bearing wedge surface is a short radius arc. As can be seen from the stress arrows, the stress forces extend from a smaller amount at one end to a larger amount at the other end.

FIG. 10 illustrates the resulting stresses illustrated by arrows perpendicular to the rod axis that occur when the wedge shapes are optimized with proper curvatures along the interface between the wedge and the metal annular surface. Two stress components exist at the wedge to rod surface interface. The first stress component 82 is perpendicular to the surface of the rod and radial to the axis. The second stress component 84 is axial and acts along the rod's surface. The present invention evenly distributes the accompanying radial stresses so that the axial tensile strength can be maximized. Excess radial stresses tend to crush the composite material on the surface of the rod. The present invention achieves an ideal radial compressive stress pattern.

FIG. 4 illustrates an initial preferred embodiment of the present invention. The connector or end fitting 30 has an elongated body 122 with a top end 126 at one end of the elongated body 122, a recess 38 adjacent the top end 126, a receptacle 32 in the top end 126 and a threaded end 44 at the opposite end of the tubular body 122. The connector 30 has exterior flat surfaces 128 formed in the tubular body 122 adjacent the threaded end 44 for being engaged by a wrench when connecting to a coupling 94. The connector 30 also has a recess 38 formed in the exterior of the tubular body 122 near the end with the receptacle 32 for being engaged by a retrieval tool to retrieve a broken sucker rod. The connector or end fitting 30 shown in FIG. 4 is partially cut-away to show the substantially cylindrical receptacle 32, the tapered annuluses 34 and 36, and the recess 38 in the tubular body 122. While the preferred embodiment has two annuluses 34 and 36, as shown in FIG. 4, it will be understood that a greater or lesser number might be employed. The end connector 30 is constructed from a sturdy metal material.

The elongated rod has a cross-section that is round, oval or rectangular. In one embodiment, the rod cross-section is circular forming a cylindrical rod.

The end connector 30 is shown in FIG. 4 after the introduction of the cylindrical rod 40 into the cylindrical receptacle 32. The cylindrical rod 40 may be composed of fiberglass, fiber reinforced synthetic resin materials, or composite matrix materials. Composite matrix materials would include material such as fiberglass composite, graphite composite, metal matrix composite, ceramic matrix composite or other composite matrix materials.

The diameter of the cylindrical receptacle 32 is slightly larger than the diameter of the cylindrical rod 40. The annuluses 34 and 36 are axially aligned and are coaxial with axis of the cylindrical receptacle 32. Each annulus 34 and 36 has a cross-section defined by a line 52 having a predetermined shape that is radially arcuate rather than straight.

As represented in FIG. 10, finite element stress analysis of the design shown in FIG. 4 indicates that the new curved profile of the annulus 34, 36 in the connector 30 will result in a uniform amount of compressive stress being applied over the entire length of the wedge 42, which provides the optimum distribution of radial stresses impressed on the exterior surface of the cylindrical rod 40 and eliminate points of concentration that limit the strength and durability of the rods 40 with the prior art designs.

FIG. 4 illustrates the present invention connector or end fitting 30 showing a cylindrical rod 40 installed in the cylindrical receptacle 32. Prior to insertion of the cylindrical rod 40, a quantity of initially flowable adhesive would be inserted into the receptacle 32. Once the cylindrical rod is, inserted, the flowable adhesive would completely fill each of the annuluses 34 and 36. An adhesive would be chosen that would securely bond to the rod. The adhesive may be cured in any number of ways including heating the end connector 30 to assist in curing. Upon curing, the adhesive will become a solid that is securely bonded to the cylindrical rod 40 to form a wedge 42 that has an arcuate shape that matches the annuluses 34 and 36. The wedge 42 will not bond to the metal connector 30 and a mold release material may be applied to the inside of the connector.

The connector 30 has a threaded end 44 which will connect with the threaded end of another connector 30 by a coupling 94, as seen in FIG. 11 to form a string of rods in an end-to-end relationship.

Figure 6:
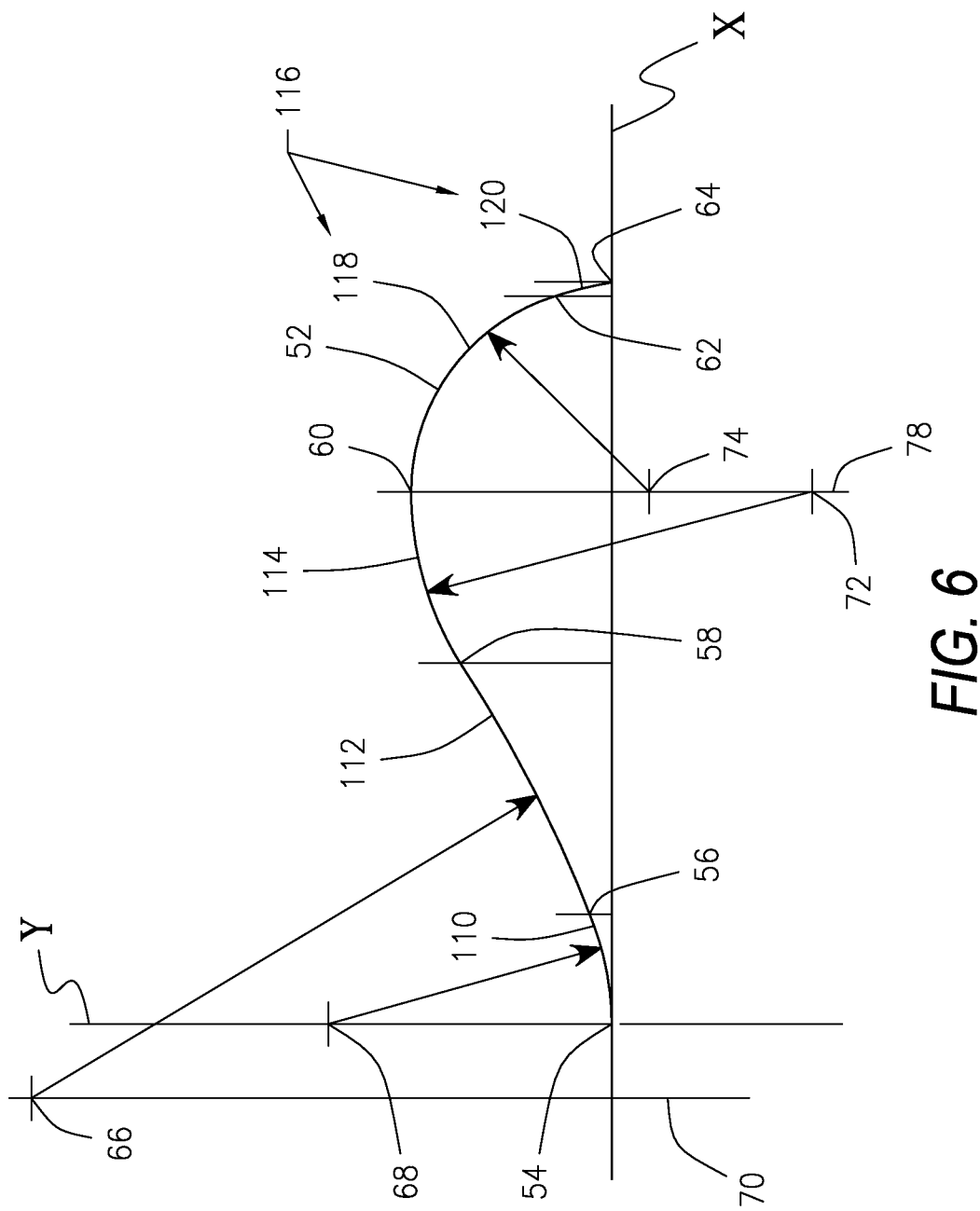
FIG. 6 illustrates a line and the arcs showing the design of the annulus in the connector shown in FIG. 4.

FIG. 6 illustrates a representation of the cross-section of the annulus 34 or 36 shown in FIG. 4 showing the shape or design of the annulus 34 or 36 through a line 52 having a predetermined shape that is radially arcuate. The X-coordinate would represent an imaginary straight line extending longitudinally along the interior wall of the cylindrical receptacle 32. The X-coordinate would, thus, extend axially along the radius of the cylindrical receptacle 32. The Y-coordinate would represent an imaginary straight line perpendicular to and intersecting the axis of the cylindrical receptacle 32.

The line 52 has a pair of opposed ends with an intermediate portion extending into the body of the connection where one end is at point 54 and the other end is at point 64. The line 52 is divided into a leading transition segment 110, a primary load bearing segment 112, a trailing transition segment 114 and a back segment 116. The back segment 116 can be further divided into a back face segment 118 and a back face transition segment 120.

FIG. 6 illustrates a line and the arcs of the annulus of the connector shown in FIG. 4.

As shown in FIG. 6, the leading transition segment 110 is between the point 54, which would be the X-Y coordinate origin (or zero point), and point 56. The leading transition segment 110 having a substantially convex shape that is radially arcuate as viewed from within the receptacle 32 where one end of the leading transition segment 110 would tangentially approach point 54 and where the other end would intersect the primary load bearing segment 112 at point 56. The center point 68 of the radius of the convex curve of the leading transition segment 110 between point 54 and point 56 would be along the Y-axis. Accordingly, the leading transition segment 110 would tangentially approach the wall of the cylindrical receptacle 32 at point 54 and would tangentially approach the primary load bearing segment at point 56.

As shown in FIG. 6, the primary load bearing segment 112 of the line 52 is between point 56 and point 58. The primary load bearing segment 112 having a substantially convex shape that is radially arcuate as viewed from within said receptacle where one end of the primary load bearing segment 112 intersects the leading transition segment 110 at point 56 and other end of the primary load bearing segment 112 intersects with one end of said trailing transition segment 114 at point 58. The center point 66 of the radius of the convex curve of the primary load bearing segment 112 between point 56 and point 58 would be along a first imaginary line 70 perpendicular to the X-axis. Accordingly, the primary load bearing segment 112 would tangentially approach the leading transition segment 110 at point 56 and would tangentially approach the trailing transition segment 114 at point 58.

As shown in FIG. 6, the trailing transition segment 114 is between point 58 and point 60. The trailing transition segment 114 having a substantially concave shape that is radially arcuate as viewed from within said receptacle where one end of the trailing transition segment 114 intersects the primary load bearing segment 112 at point 58 and the other end of the trailing transition segment 114 intersects the back segment 116 at point 60. The center point 72 of the radius would be along a second imaginary line 78 perpendicular to the X-axis. Accordingly, the trailing transition segment 114 would tangentially approach the primary load bearing segment 112 at point 58 and would tangentially approach the back segment 116 at point 60.

As shown in FIG. 6, the back segment 116 is between point 60 and point 64. The back segment 116 having a substantially concave shape that is radially arcuate as viewed from within said receptacle where one end of the back segment 116 intersects the trailing transition segment 114 at point 60 and the other end of the back segment 116 approaches the receptacle wall at point 64. The back segment 116 comprises a back face segment 118 and a back face transition segment 120.

As shown in FIG. 6, the back face segment 118 is between point 60 and point 62. The back face segment 118 having a substantially concave shape that is radially arcuate as viewed from within said receptacle where one end of the back face segment 118 intersects the trailing transition segment 114 at point 60 and the other end of the back face segment 118 intersects the back face transition segment 120 at point 62. The center point 74 of the radius would be along the second imaginary line 78 perpendicular to the X-axis. Accordingly, the back face segment 118 would tangentially approach the trailing transition segment 114 at point 60 and would tangentially approach the back face transition segment 120 at point 62.

One embodiment of the back face transition segment 120 is shown in FIG. 6, where the back face transition segment 120 is between point 62 and point 64. The back face transition segment 120 having a substantially concave shape that is radially arcuate as viewed from within said receptacle where one end of the back face transition segment 120 intersects the back face segment 118 at point 62 and the other end of the back face transition segment 120 intersects the X-axis at point 64. The center point 74 of the radius would be along the second imaginary line 78 perpendicular to the X-axis. Accordingly, the back face transition segment 120 would tangentially approach the back face segment 118 at point 62 and would intersect the wall of the cylindrical receptacle 32 at point 64.

As described above, all of the segments of the line 52 are radically arcuate. These segments may also include other curve types and combinations of line segments that closely approximate an arcuate shape within the optimum range of radii.

The primary load bearing radius of the wedge 42 must have the proper curvature to achieve the uniform radial stress pattern as shown in FIG. 10. The degree of curvature in the transition surfaces at the ends of the wedges 42 also has substantial impact on their effectiveness in controlling shear stress. Longer transition curves are more effective than shorter curves that have been used in prior composite matrix material sucker rod connector designs. The ranges of radius length that can effectively optimize radial and shear stresses are as follows: (1) the radius of the leading transition segment 110 is greater than 9 inches and less than 500 inches; (2) the radius of the primary load bearing segment 112 is greater than 42 inches and less than 500 inches; and (3) the radius of the trailing transition segment 114 is greater than 3 inches and less than 500 inches.

A second method of defining the optimum range of radii for a wedge system is to determine the ratio of radius length to total wedge length for the connector. The Optimum Ratio equals the radius length divided by the total wedge system length (Optimum Ratio=Radius Length/Total Wedge System Length). The Optimum Ratio should be within the following ranges:

Leading Transition Segment 2.4<Optimum Ratio<166
Primary Load Bearing Segment 10.9<Optimum Ratio<166
Trailing Transition Segment 0.8<Optimum Ratio<166

Figure 5:
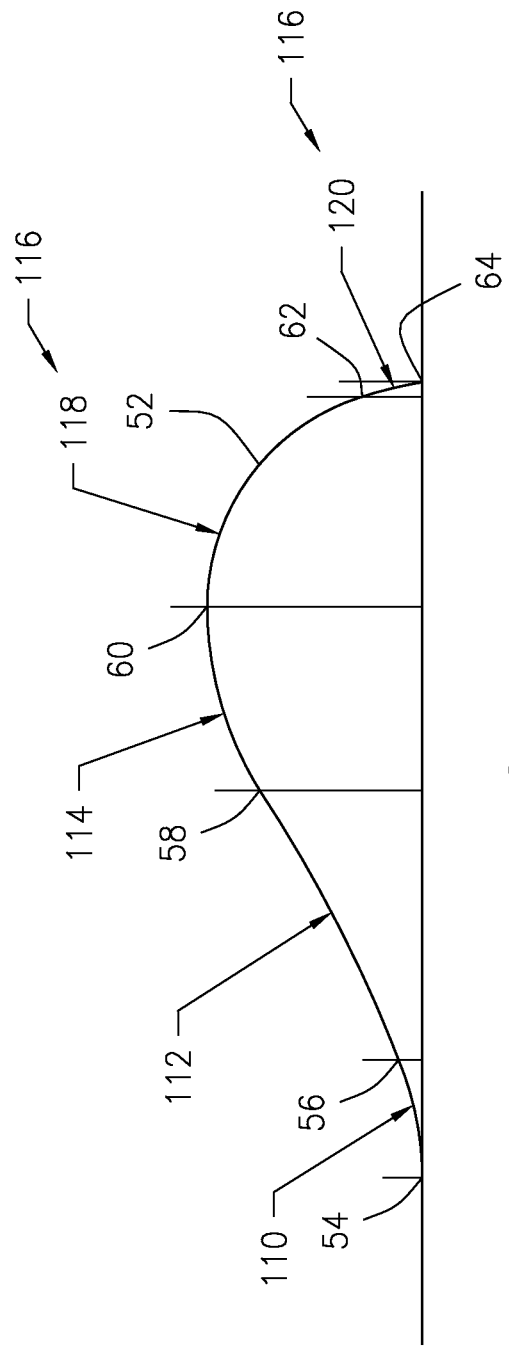
FIG. 5 illustrates a line and line segments of the annulus in the connector shown in FIG. 4.

The load bearing portion of the wedge includes the leading transition segment 110, the primary load bearing segment 112 and the trailing transition segment 114 shown in FIG. 5 and FIG. 6. These segments are in direct contact with and press against the mating surface of the metal connector 30. When the sucker rod is loaded in tension, stress is transmitted from the connector 30 into the wedge 42 through this portion of the wedge surface. The back face segments 118 and the back face transition segments 120 do not bear any loads from the connector 30. They simply bring closure to the wedge profile. They do not receive stress from the connector or transmit stress to the composite matrix material rod body.

When a sucker rod undergoes positive tensile loading in an axial plane, radial compressive loads act only on those surfaces with inclination greater than zero degrees and less than ninety degrees from the rod surface shown. That includes only the leading transition segment 110, the primary load bearing segment 112 and the trailing transition segment 114 shown in FIG. 5 and FIG. 6. The back face segment 118 and the back face transition segment 120 surfaces are therefore ineffective in bearing the radial compressive stresses that accompany the applied tensile loads.

The total connector length is limited by industry standards (i.e. American Petroleum Institute standards), which limits the length available for the wedge system. Because the length available for wedges 34 and 36 is limited, it is advantageous to the overall strength of the wedge system to minimize the wedge length that is occupied by the back face segment 118 and the back face transition segment 120. This is accomplished by limiting the number of wedges. The advancements presented in this invention are applicable for a plurality of wedges in the connector 30. Two wedges 34 and 36 allow for a maximum amount of load bearing surface on the wedges 34 and 36 and thus spreads the applied forces over the largest possible surface area and minimizes the stress at any particular point.

As shown in FIG. 4, the connector or end fitting 30 has a tubular body 122 with a top end 126 at one end of the tubular body 122, a recess 38 adjacent the top end 126, a receptacle 32 in the top end 126 and a threaded end 44 at the opposite end of the tubular body 122. The recess 38 is situated in the exterior surface of the tubular body 122 at a predetermined distance from the top end 126. The recess 38 having a substantially channel shape of predetermined dimensions whereby the recess 38 cooperates with a retrieval tool to allow the retrieval of the connector 30 when said cylindrical rod 40 breaks or the connector 30 breaks or a coupling 94 breaks.

The recess 38 having a first recess surface 46, a second recess surface 48 and a third recess surface 50. The first recess surface 46 being situated at a predetermined distance from the top end 126 of the tubular body 122 having a substantially flat shape with alignment along an imaginary line perpendicular to axis of the cylindrical receptacle 32 and having a predetermined length 12 starting at the exterior surface of the tubular body 122 and extending toward the cylindrical receptacle 32.

The second recess surface 48 being situated at a predetermined distance from said top end of said tubular body having a substantially flat shape with alignment along another imaginary line perpendicular to the axis of the cylindrical receptacle 32 such that said first recess surface and said second recess surface are parallel to each other. The second recess surface 48 having a predetermined length 12 starting at the exterior surface of said tubular body 122 and extending toward said cylindrical receptacle 32 that is identical to the predetermined length of the first recess surface 46.

The third recess surface 50 having a substantially flat shape with alignment along an imaginary line parallel to the axis of the cylindrical receptacle 32. The third recess surface 50 having a predetermined length 11 and being situated at a predetermined distance from the exterior surface of the tubular body 122 that is equal to the predetermined length of said first recess surface 46 and to the predetermined length of said second recess surface 48 such that the third recess surface 50 connects the first recess surface 46 to the second recess surface 48 to form the substantial channel shape of said recess 38.

The recess 38 as presented in the present invention is bound on both sides by a shoulder, making it conducive to positive gripping by retrieval tools that are widely used in the oil industry for other applications. The recess 38 cooperates with a retrieval tool to allow the recovery of fractured rod strings or broken connectors without the necessity of pulling the pipe to recover the rods inside the wellbore.

Whereas, the present invention has been described in relation to the drawings attached hereto, it should be understood that other and further modifications, apart from those shown or suggested herein, may be made within the spirit and scope of this invention.

What is claimed is:

1. A connector to connect the end of an elongated rod, which connector comprises:
    an elongated body having a top end, an exterior surface and a receptacle opening received in said top end therein, the opening providing a receptacle wall; and
    said receptacle wall being defined by a plurality of axially aligned tapered annuluses, each annulus having a cross-section defined by a line having a predetermined shape, said line comprising a leading transition segment, a primary load bearing segment, a trailing transition segment and a back segment, said leading transition segment having a substantially convex shape that is radially arcuate as viewed from within said receptacle where one end arcuately approaches said receptacle wall and where other end intersects with one end of said primary load bearing segment, said primary load bearing segment having a substantially convex shape that is radially arcuate as viewed from within said receptacle where other end intersects with one end of said trailing transition segment, said trailing transition segment having a substantially concave shape that is radially arcuate as viewed from within said receptacle where other end intersects with one end of said back segment, and said back segment having a substantially concave shape that is radially arcuate as viewed from within said receptacle where other end approaches said receptacle wall;
    means for uniform distribution of radial compressive stress forces along the length of each annulus wherein said primary load bearing segment, said leading transition segment and said trailing transition segment each have a range of ratios of radius length to total length of the plurality of tapered annuluses with said primary load bearing segment having said range of ratios between 10.9 and 166, said leading transition segment having said range of ratios between 2.4 and 166 and said trailing transition segment having said range of ratios between 0.8 and 166; and
    wherein said elongated body has a recess situated adjacent to said top end and having a substantially channel shape of predetermined dimensions bound on both sides by a shoulder whereby said recess cooperates with a retrieval tool to retrieve said connector when said cylindrical rod or wire breaks.

2. A connector as set forth in claim 1 wherein said back segment further comprises a back face segment and a back face transition segment, said back face segment having a substantially concave shape that is radially arcuate as viewed from within said receptacle where one end intersects with said other end of said trailing transition segment and where other end intersects with one end of said back face transition segment, and said back face transition segment having a substantially concave shape that is radially arcuate as viewed from within said receptacle where other end intersects said receptacle wall.

3. A connector as set forth in claim 1 wherein an initially flowable adhesive may be inserted in said receptacle prior to insertion of said cylindrical rod so that said adhesive will fill said annuluses and harden or cure to form a solid.

4. A connector as set forth in claim 1 wherein said elongated rod has a cross-section that is round, oval or rectangular and wherein said rod is fiberglass, fiber reinforced synthetic resin material or composite matrix material, and wherein each end of each said rod may be attached to a connector and wherein adjoining connectors may be attached together.

5. A connector as set forth in claim wherein said recess having a first recess surface, a second recess surface and a third recess surface and said cylindrical receptacle having an axis,
    said first recess surface being situated at a predetermined distance from said top end of said tubular body having a substantially flat shape with alignment along an imaginary line perpendicular to said axis of said cylindrical receptacle;
    said second recess surface being situated at a predetermined distance from said top end of said tubular body having a substantially flat shape with alignment along another imaginary line perpendicular to said axis of said cylindrical receptacle such that said first recess surface and said second recess surface are parallel to each other;
    said third recess surface having a substantially flat shape with alignment along an imaginary line parallel to said axis of said cylindrical receptacle having a predetermined length and being situated at a predetermined distance from the exterior surface of the tubular body that is equal to the predetermined length of said first recess surface and to the predetermined length of said second recess surface such that said third recess surface connects said first recess surface to said second recess surface to form the substantially channel shape of said recess.

* * * * *